Feb. 28, 1950 L. D. TYSON 2,499,235
HYDRAULIC SYSTEM FOR PLURAL MOTOR OPERATION
Filed Aug. 13, 1943 4 Sheets-Sheet 1

INVENTOR.
Levi D. Tyson

Patented Feb. 28, 1950

2,499,235

UNITED STATES PATENT OFFICE 2,499,235

HYDRAULIC SYSTEM FOR PLURAL MOTOR OPERATION

Levi D. Tyson, Elkhart, Ind., assignor, by mesne assignments, to Gisholt Machine Company, a corporation of Wisconsin Application August 13, 1943, Serial No. 498,491

6 Claims. (Cl. 60—97)

The present invention relates to improvements in machine tools.

The invention will be described in connection with lathes, the particular type of lathe chosen for illustration being one having a movable platen, a fluid operated motor for operating said platen with a reciprocatory movement, said platen having mounted thereon a tool slide operating fluid motor adapted to operate certain tools with a reciprocatory movement. The two fluid motors are operated from the same pressure source. In some operations, after the tools have advanced throughout their forward stroke, it is desired to withdraw the platen throughout a portion of its stroke, before the tool slide operating motor is rendered operative, after which the tool slide operating motor will complete its operation, followed by the remainder of the platen withdrawal stroke. In other operations the sequence of movements is changed and the tool slide operating motor is operated prior to withdrawal of the platen. In certain machines with which applicant is familiar it has been necessary to interchange the pipe connections to the two fluid motors or to provide valves or the like to produce the desired sequence, and such changes have introduced the hazard of leaks and have increased costs.

An object of the present invention is to provide a machine tool having a pair of operating fluid motors adapted to be supplied with fluid pressure from the same source in which the sequence of operation of said motors may be changed by a relatively slight change in mechanical connections.

A further object is to provide a machine tool having a plurality of fluid motors adapted to be supplied with fluid pressure from the same source, which motors are adapted to be operated sequentially, said machine tool being provided with simple means through which the sequence of operation of said motors may be readily controlled.

A further object is to provide a machine tool of the kind referred to in which loss due to leakage is minimized and the full delivery of volume of oil from the fluid pressure source to its useful destination is insured.

A further object is to provide a machine tool having a pair of fluid motors adapted to be sequentially operated, said machine tool being provided with a relatively simple valve mechanism for determining the sequence of operation of said motors, which valve mechanism is well balanced and which avoids difficulties due to differences in pressure upon the moving elements thereof.

A further object is to provide a machine tool having a pair of fluid motors adapted to be sequentially operated, which machine tool is provided with simple control valve mechanism for determining the sequence of operation of said motors.

A further object is to provide an improved valve adapted to be used in combination with a pair of operating fluid motors of a machine tool or the like, which valve, by a simple mechanical change, is adapted to control the sequence of operation of said motors.

A further object is to provide an improved control valve for two fluid motors adapted to be operated in sequence, which valve is well adapted to meet the needs of commercial operation.

Further objects will appear as the description proceeds.

Referring to the drawings—

Figure 1:
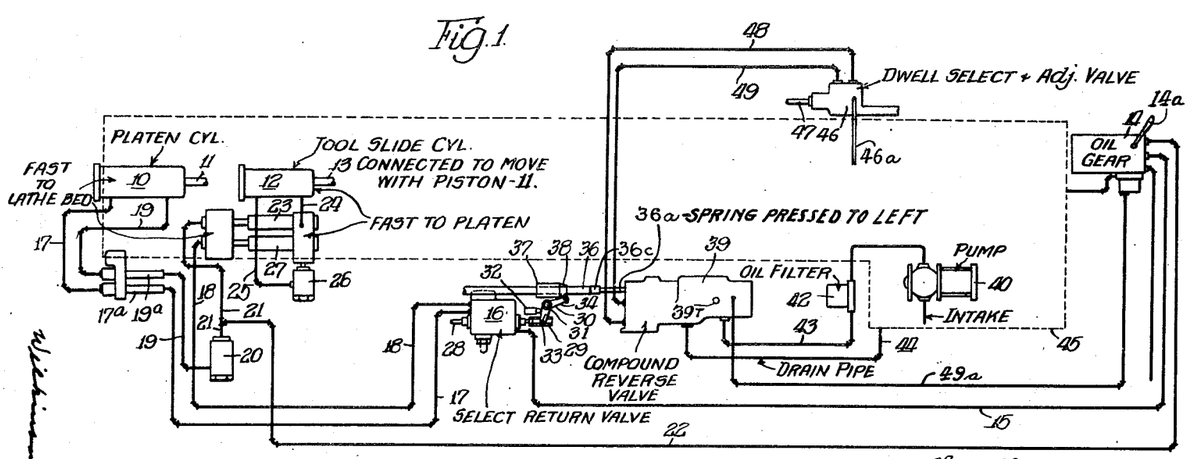
Figure 1 is a diagrammatic layout of the elements of a machine tool, together with fluid pressure control means for said elements.

Referring first to Figure 1, the numeral 10 indicates the cylinder of a platen motor which may be secured to the bed of a lathe or other machine tool. Mounted within said cylinder 10 is a reciprocable piston for operating the piston rod 11, which may be connected to the reciprocable platen of said lathe. Secured to said platen and adapted to reciprocate with the piston rod 11 is the cylinder 12 of the tool slide motor. Disposed within said cylinder 12 is a piston for operating the piston rod 13, which may be connected to a tool slide of said lathe. Liquid under pressure may be selectably delivered to the two ends of either of the cylinders 10 and 12, a source 14 being provided which is common to said two cylinders 10 and 12. Liquid under pressure is delivered from the source 14 through the conduit 15, which leads to one extremity of the select return valve 16. Two conduits 17 and 18 lead from the other extremity of said select return valve 16. The source of liquid pressure 14 may be provided with an operating handle 14a, which will operate to inaugurate a cycle of operation of the tool slide from its fully withdrawn position to its operating position back to its fully withdrawn position, as illustrated and described in the Foster Patent No. 2,008,011, reference being had particularly to Figures 1 and 7, the operating handle in said patent being indicated by the numeral 80. The specification of said patent, on page 3, second column, lines 15 to 23, and page 6, second column, lines 24 et seq., describes the operation of such a handle and its associated parts.

Figure 5:
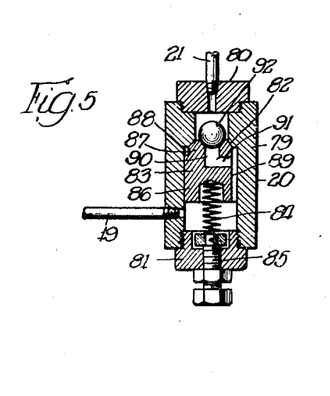
Figure 5 is a sectional view of a resistance valve which may be used in the layout illustrated in Figure 1.

The conduit 17 leads through the telescopic connector 17a to the left-hand extremity of the platen cylinder 10 as the parts are viewed in Figure 1. The right-hand extremity of the platen cylinder 10 is provided with the conduit 19, which through the telescopic connector 19a leads to one extremity of the resistance valve 20. The telescopic connectors 17a and 19a are provided for the purpose of permitting change of the position of the platen cylinder 10 relative to the bed of the lathe, which change is desirable for positioning the platen cylinder 10 to suit the physical dimension of the piece of work to be machined. The telescopic connectors 17a and 19a avoid the disadvantage of flexible tubes or the necessity of changing pipe connectors. The details of this resistance valve 20 are illustrated in Figure 5 and will be described presently. A conduit 21 leads from the other extremity of the resistance valve 20. Said conduit 21, through the conduit 22, is connected to the source of liquid pressure 14.

Said conduit 21 also leads through the telescopic connector 23 to the conduit 24 leading to the right-hand extremity of the tool slide cylinder 12. Leading from the left-hand extremity of the slide cylinder 12 is the conduit 25, which is conected to one extremity of the resistance valve 26, which may be similar in construction to the resistance valve 20, though for normal operation it will preferably be designed to operate at a higher resistance value. The other extremity of the resistance valve 26 is connected through the telescopic connector 27 to the conduit 18. The platen cylinder 10 and the fixed portions of the telescopic connectors 23 and 27 will be fast with the bed of the lathe. The tool slide cylinder 12 and the movable portions of the telescopic connectors 23 and 27 will be fast with the platen.

The details of the select return valve 16 are illustrated more or less diagrammatically in Figures 2 and 3 and will be described presently. For the present it may be stated that said select return valve is provided with the shaft 28 carrying the link 29. Said link is adapted to be connected to the bell crank lever 30 pivoted to swing about the axis 31. Said bell crank lever 30 is biased to swing in a counter-clockwise direction by the spring return device 32. The bell crank lever 30 includes the two arms 33 and 34, of which the arm 33 is adapted to be connected to the link 29 at two alternative regions, as will be more particularly pointed out hereinafter. The swinging extremity of the arm 34 of the bell crank lever 30 is provided with a roller 35 adapted to engage a reciprocable shaft 36. Secured to said shaft 36 is the shoe 37 having an extremity in the form of a truncated cone, as indicated by the numeral 38. Said shaft 36 is positioned to abut against a shaft 36a disposed coaxially therewith, which shaft 36a is provided with a spring 36b which urges said shaft 36a toward the left as the parts are viewed in Figures 1, 6 and 7. Said spring 36b reacts between a collar 36c on said shaft 36a and the casing of a valve 39. The shaft 36 is adapted to be reciprocated in response to the operation of the tool slide (rigid with piston rod 13). The connection between the tool slide and the shaft 36 may be rigid if preferred, or may be through a lost motion connection.

The valve 39 is a compound reverse valve of known type having the function of controlling the direction of liquid flow from the source 14 through the conduits 15 and 22. The numeral 40 indicates a pump, which through the filter 42 and conduit 43, is adapted to provide liquid pressure to said compound reverse valve 39. A return for liquid from the compound reverse valve 39 is provided through the drain pipe 44 to the oil sump indicated by dotted lines and bearing the reference numeral 45. The numeral 46 indicates a dwell select and adjusting valve of known type having a rod 47, which rod is responsive to the movement of the piston rod 13, rigid with the tool slide. Said dwell select and adjusting valve 46 is connected to the compound reverse valve 39 through the conduits 48 and 49. The pipe 49a communicates pressure from the reverse valve 39 to the oil gear 14 for the purpose of causing reversal in the direction of pressure generated by said oil gear 14, as will be referred to more particularly hereinafter.

The dwell select and adjusting valve 46 and the compound reverse valve 39 are instrumentalities well known to those skilled in the art and they, with their associated parts, have the function of predetermining at the option of the operator of the machine the amount of dwell, if any, at the end of the forward stroke of the tool slide before reversal thereof, and for controlling the direction of liquid flow from the source 14 through the conduits 15 and 22.

Figure 6:
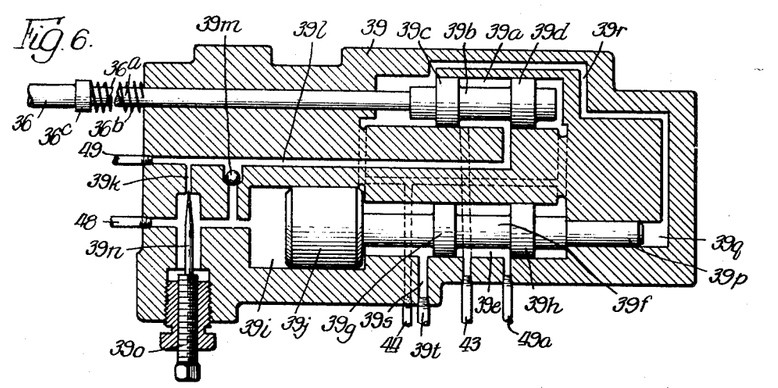
Figures 6 and 7 indicate schematically a compound reverse valve, well known in the prior art, which may be used in the practice of the present invention.
Figure 7:
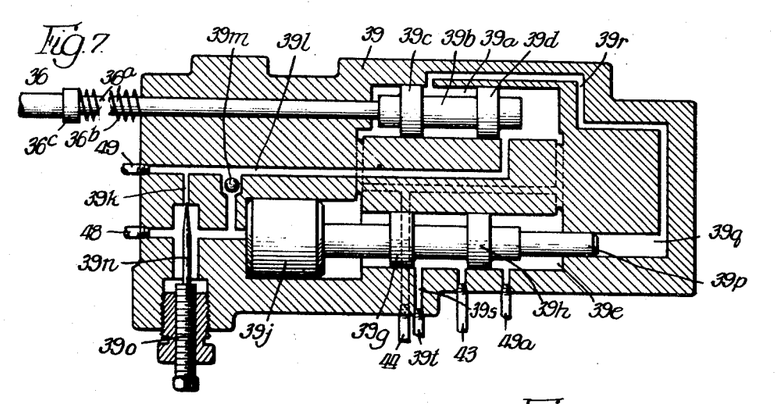

For purposes of convenience, the interior construction of the valve 39 is illustrated schematically in Figures 6 and 7. Said valve 39 is well known in the prior art, having been in public use long prior to the filing of the present application in the Foster Fastermatic semi-automatic turret lathes manufactured and sold by the Foster Machine Company, of Elkhart, Indiana. Said valve 39 is provided with the bore 39a for receiving the plunger 39b having the two pistons 39c and 39d spaced from one another. Said plunger 39b is fast with the shaft 36a.

Said valve 39 is also provided with the bore 39e receiving the plunger 39f, which plunger has the two pistons 39g and 39h spaced apart from one another. Communicating with the left-hand extremity of the bore 39e is the bore 39i having therein the piston 39j. Extending from the left-hand side of the piston 39g is an extension adapted to abut against the piston 39j. The conduit 43 has communication with the bore 39e at the region between the two pistons 39g and 39h. Said conduit 43 also has communication with the bore 39a at the region between the pistons 39c and 39d. The drain pipe 44 communicates with both ends of each of the two bores 39a and 39e. The conduit 48 has communication with the left-hand extremity of the bore 39i. Said conduit 48 also has communication through the orifice 39k with a passageway indicated by the numeral 39l, which connects with the conduit 49. Said passageway 39l also communicates with the bore 39a between the pistons 39c and 39d when the plunger 39b is in its right-hand position (Fig. 6). Said conduit 39l communicates with the space to the right of the plunger 39b when said plunger is in its left-hand position as illustrated in Figure 7. Communication between conduit 48 and the passageway 39l and conduit 49 is controlled by the check valve 39m, which permits flow of liquid from conduit 48 to conduit 49 but stops flow of liquid in the opposite direction. The orifice 39k may be controlled by the needle valve 39n responsive to the screw 39o. The numeral 39p indicates a piston reciprocable in the bore 39q, which bore communicates through the passageway 39r with the left-hand region of the bore 39a. With the plunger 39b in its right-hand position as indicated in Figure 6, said passageway 39r communicates with the left-hand extremity of the bore 39a. With the plunger 39b in its left-hand position as indicated in Figure 7, said passageway 39r communicates with said bore 39a at the region between the pistons 39c and 39d. Communicating with the bore 39e is the passageway 39s, which may have communication with the oil gear 14, if desired, in conformity with the practice in connection with certain well known hydraulically operated machine tools which have long been in service, to wit—the Foster Fastermatic turret lathes above mentioned. However, for purposes of simplicity in this description said passageway 39s is closed by means of the plug 39t, which also conforms to the practice in connection with the hydraulically operated machine tools referred to.

When the shaft 36 (which moves in response to the tool slide rigid with the piston rod 13) is at its extreme right-hand position as shown in Figure 6, the oil under pressure from the pump 40 through the conduit 43 will have communication with the passageway 39l through the orifice 39k past the needle valve 39n to the bore 39i, causing the plunger 39f to move to the right as shown in Figure 6, which in turn permits oil from the conduit 43 to have communication through conduit 49a to the oil gear 14, causing reversal of the direction of pressure developed by said oil gear 14. As a result of the reversal of pressure developed by the oil gear 14 the tool slide will be carried to the left as the parts are viewed in Figures 1, 6 and 7, moving the shaft 36 to the left, permitting the spring 36b to shift the plunger 39b to the position shown in Figure 7. Oil under pressure flows from the conduit 43 to the right-hand end of the bore 36q, whereby the plunger 39p moves the plunger 39f to its extreme left-hand position as indicated in Figure 7. The parts are now in position whereby the operator, by manipulation of the handle 14a, may start a new operating cycle.

The dwell select and adjusting valve 46 is a valve well known to those skilled in the art, having been embodied in the Foster Fastermatic semi-automatic turret lathes manufactured and sold long prior to the filing date of this application by the Foster Machine Company, of Elkhart, Indiana. For purposes of convenience this valve may be briefly described herein.

Figure 8:
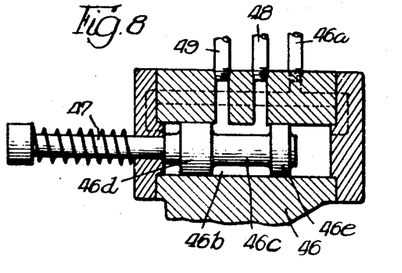
Figures 8 and 9 indicate schematically a dwell select and adjusting valve well known in the prior art, which may be used in the practice of the present invention.
Figure 9:
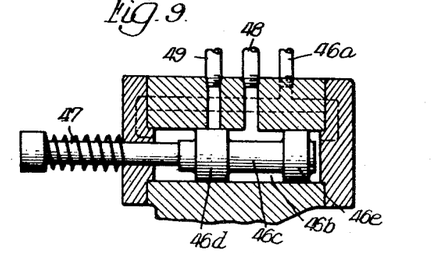

Said valve 46 is provided with the bore 46b having the plunger 46c, which plunger includes the pistons 46d and 46e spaced from each other. Said plunger is connected to the rod 47 responsive to the movement of the piston rod 13 rigid with the tool slide. If preferred, said rod 47 may be connected to the tool slide through the usual lost motion connection. The conduits 48 and 49 communicate with the bore 46b. When the plunger 46c is in its left-hand position as indicated in Figure 8, said conduits 48 and 49 have communication with each other. When said plunger 46c is in its right-hand position as indicated in Figure 9, a communication is cut off between said conduits 48 and 49. A drain pipe 46a has communication with the two ends of the bore 46b.

It will be clear without detailed explanation that when there is full unrestricted communication between the conduits 48 and 49, fully effective pressure will be communicated from the pump 40, through conduit 43, bore 39a, passageway 39l, through conduit 49 to the valve 46, through the conduit 48, to the lefthand extremity of the bore 39i, resulting in a rapid movement of the piston 39j toward the right as the parts are viewed in Figure 6. Under these conditions the period of dwell of the tool slide at the right-hand end of its stroke will be a minimum. On the other hand, if the operator desires a prolonged period of dwell he will so adjust the lost motion mechanism controlling the rod 47 that communication will be interrupted between the conduits 48 and 49, as shown in Figure 9, in which case communication from the pump 40 through conduit 43, through the bore 39a and passageway 39l will be through the orifice 39k past the needle valve 39n to the left-hand extremity of the bore 39i, causing a controlled flow of liquid to said bore 39i to move the piston 39j at a reduced speed toward the right, causing the desired period of dwell of the tool slide rigid with the piston rod 13.

In the event that the plunger 46c is in its interrupting position as shown in Figure 9, the piston 39j may move rapidly in its return movement toward the left as the parts are viewed in Figure 7, the liquid from the left-hand extremity of the bore 39i passing upwardly past the check valve 39m to the passageway 39l through the right-hand extremity of the bore 39a to the drain pipe 44.

According to the present invention the desired sequence of operation of the platen cylinder 10 and the tool slide cylinder 12 may be accomplished by a simple change in the connection of the bell crank lever 30 with the link 29 carried by the shaft 28 of the select return valve 16.

Figure 2:
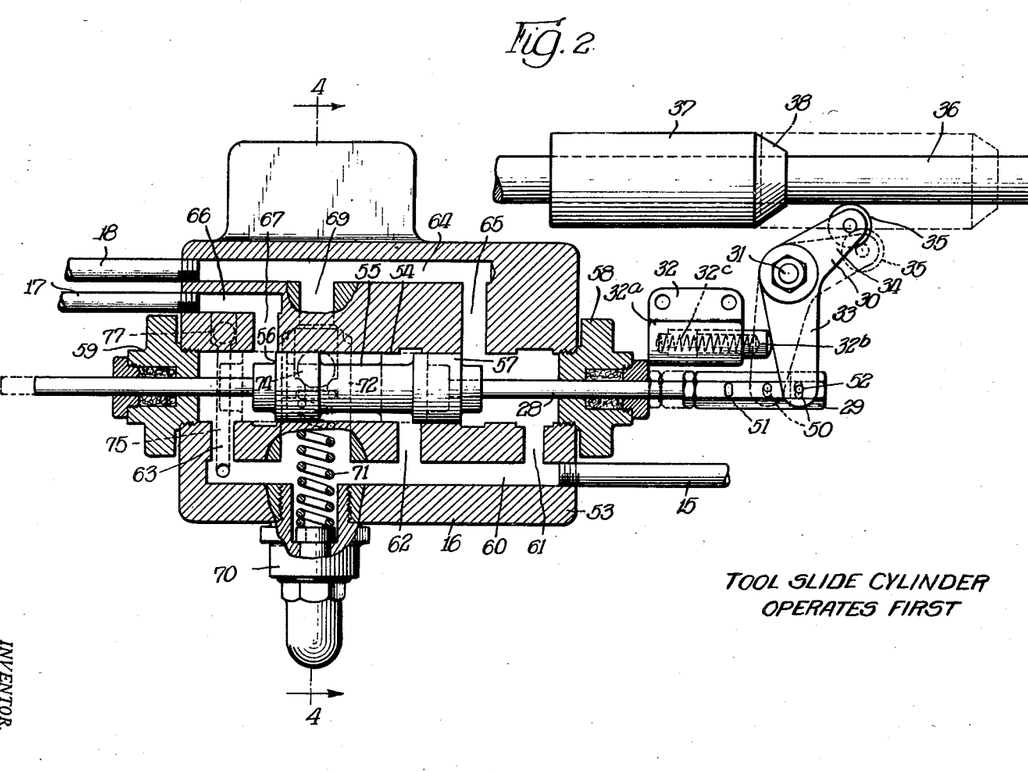
Figure 2 is a view in section, more or less diagrammatic in its nature, illustrating a valve for controlling the sequence of operation of two reciprocating fluid motors, the connections to said valve as illustrated in Figure 2 being such as to result in the complete withdrawal or return operation of the tool slide operating motor prior to the withdrawal or return operation of the platen operating motor.
Figure 3:
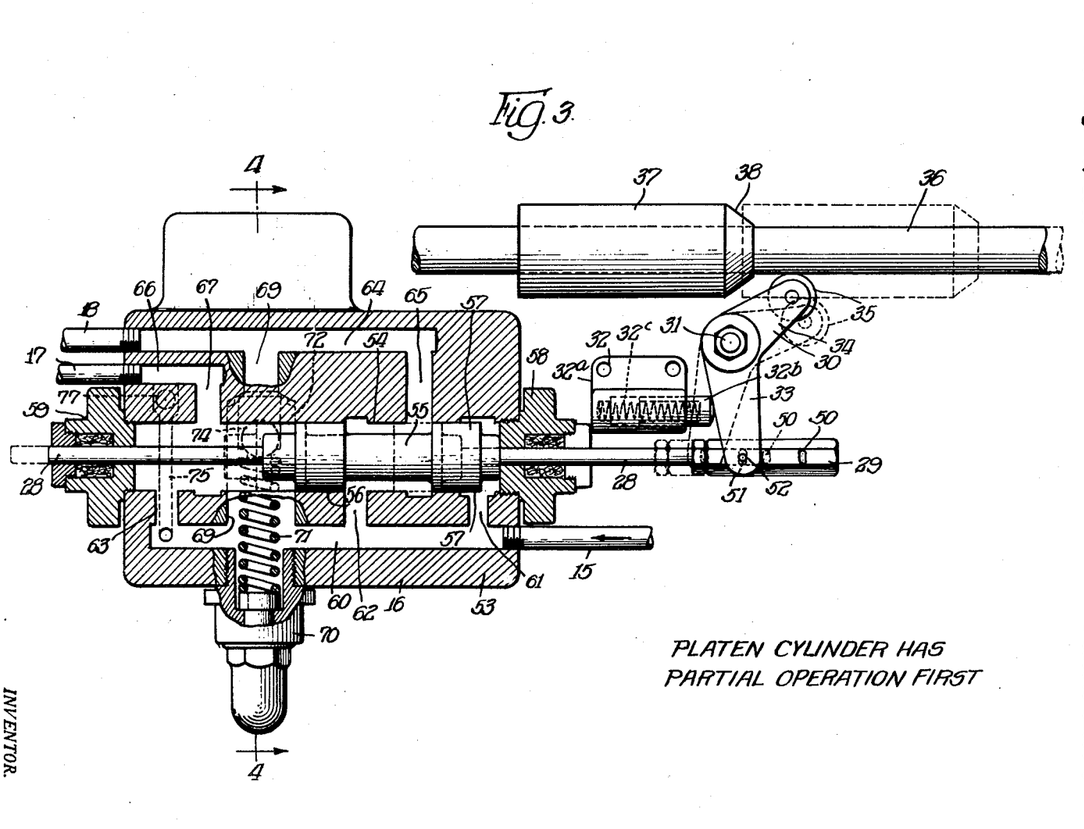
Figure 3 is a view similar to Figure 2 but showing the connections to said valve to produce the result that the platen operating motor is operated for a predetermined distance prior to operation of the tool slide operating motor, after which the tool slide operating motor is operated throughout its range, followed by the completion of the operation of the platen operating motor.

Reference may now be made to Figures 2 and 3, which represent, respectively, (1) the connection of the bell crank lever 30 to the link 29, when the tool slide cylinder 12 is to be operated on its complete return stroke before the platen 10 starts its return stroke, and (2) when the platen cylinder 10 is to be operated first through part of its return stroke, followed by complete operation of the tool slide cylinder 12, followed by the remainder of the operation of said platen cylinder 10. It will be noted that the spring return mechanism 32 includes a housing 32a carrying a plunger 32b biased by a spring 32c to urge the bell crank lever 30 in a counter-clockwise direction as the parts are viewed in Figures 1, 2 and 3. The link 29 is provided with a pair of apertures 50 and 51. The arm 33 of the bell crank lever 30 may be bifurcated to form a clevis encompassing the link 29, and the legs of this bifurcated portion will be provided with an aperture for the reception of a clevis pin 52. By removing the clevis pin 52 and moving the shaft 28 longitudinally, the apertures in the bifurcated arm 33 may be brought into registry with aperture 50 or 51 of the link 29, after which the clevis pin 52 may be inserted to again connect the shaft 28 and link 29 with the arm 33 of the bell crank lever 30.

The select return valve 16 includes a cylindrical housing 53 having a central bore 54 for the reception of the plunger 55. Said plunger 55 includes the two pistons 56 and 57 of uniform diameter, spaced apart. The plunger 55 is mounted on the shaft 28, which, at the two extremities of the valve 16 pass through the packing glands 58 and 59. The shaft 28 at the portions thereof which extend through the packing glands 58 and 59 will preferably be of the same diameter, and consequently fluid pressure will be equalized at the two extremities of the plunger 55, whereby (due to the provision of ports, to be described presently) longitudinal movement of the shaft 28 and the link 29 will be simplified after the clevis pin 52 has been removed from engagement with the link 29.

The conduit 15 leading from the source of liquid pressure 14 communicates with the longitudinally extending passageway 60, which communicates with the bore 54 through the ports 61, 62 and 63. The housing 53 of the valve 16 is also provided with the longitudinally extending passageway 64, which communicates with the bore 54 through the port 65.

It will be noted that the pistons 56 and 57 of the plunger 55 are so related to each other and to the ports communicating with the bore 54 that: (1) with the shaft 28 connected to the bell crank lever 30 as shown in Figure 2, with the plunger 55 in its right-hand position (shown in full lines), the piston 56 leaves port 67 unblocked, and piston 57, though it stops communication between ports 62 and 65, permits communication between ports 61 and 65, and with the plunger 55 in its left-hand position (shown in broken lines) port 67 is blocked by piston 56, and though piston 57 stops communication between ports 62 and 65 it still permits communication between ports 61 and 65; and (2) with the shafts 28 connected to the bell crank lever 30 as shown in Figure 3, with the plunger 55 in its right-hand position (shown in full lines), piston 57 stops communication between ports 61 and 65 but permits communication between ports 62 and 65, the other ports being unblocked, and with the plunger 55 in its left-hand position (shown in broken lines) port 65 is blocked by piston 57 but piston 56 is not in blocking relationship with any of the ports.

The housing 53 of the select return valve 16 is also provided with the longitudinally extending passageway 66, which has communication with the bore 54 through the port 67.

Figure 4:
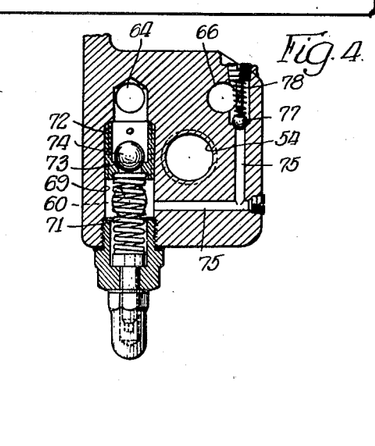
Figure 4 is a cross sectional view taken along the plane indicated by the arrows 4—4 of Figures 2 and 3.

The housing 53 of the select return valve 16 is provided with the aperture 69 (Figures 2, 3 and 4) disposed vertically as the parts are viewed in Figures 2, 3 and 4 and offset from the bore 54. The lower extremity of the aperture 69 is closed by means of the plug 70, which forms the seat for the vertically disposed spring 71 adapted to engage the under side of the sleeve valve 72, slidable within the aperture 69. The sleeve valve 72 is provided with the seat 73 for the reception of the check valve 74. The aperture 69 communicates through the sleeve valve 72 (controlled by the check valve 74) with the passageway 64, which leads to the conduit 18. The aperture 69 has communication through the passageway 75 with the passageway 66 leading to the conduit 17. Communication between the passageway 75 and the passageway 66 is controlled by the check valve 77, which is urged to its seated position by the spring 78. The sleeve valve 72 with its spring 71 and its check valve 74 constitutes a resistance valve similar in operation to the resistance valve illustrated in Figure 5.

Referring now to the resistance valves 20 and 26, their details are illustrated in Figure 5. As indicated above, the designs of said valves will preferably be so chosen that valve 20 presents less resistance to fluid flow than does valve 26. In other particulars their constructions may be similar and a description of one of said valves will suffice for a description of both. A valve suitable for the purpose is illustrated in the patent to William H. Foster No. 2,008,011, patented July 16, 1935, embodiments thereof being indicated in Figure 10 of said patent by the numerals 121, 122 and 123. Such a valve and the operation thereof are described on page 5 of the specification of said patent, lines 10 et seq., second column, and page 6, lines 70 et seq., second column. For convenience the valve 20 will be described herein as follows:

Said valve comprises the cylindrical wall 79 having the cylinder heads 80 and 81. The bore of the cylinder wall 79 is formed to provide a conical seat 82 for limiting movement in one direction of the plunger 83, which plunger 83 is shaped at one of its extremities to conform to said conical seat 82. A spring 84 is provided for urging the plunger 83 against the seat 82, the tension of which may be adjusted as for example by means of the adjusting screw 85. The plunger 83 is provided with the relatively large portion 86 having a sliding fit within the cylindrical wall 79. At one extremity of the enlarged portion 86 is the reduced portion 87 providing the annular recess 88. The plunger 83 is longitudinally slotted, as indicated by the numeral 89. Disposed axially of the plunger 83 is the bore 90, which through the cross aperture 91 communicates with the longitudinal slot 89. The ball valve 92 resting upon the upper surface of the plunger 83 is adapted to control communication between the bore 90 and the space above the plunger 83.

Referring now to the mode of operation of the above described embodiment of the present invention, it may be again stated that the function of the select return valve 16 is to selectively control the sequence of the return operations of the platen cylinder 10 and the tool slide cylinder 12, which cylinders are connected to the same pressure source 14. Sometimes it becomes necessary in the return operations of said cylinders to first operate the tool slide cylinder 12, and after its operation is completed to operate the platen cylinder 10. At other times in the return operations of said cylinders, it is necessary to operate the platen cylinder 10 for a predetermined distance, then operate the tool slide cylinder through its range of movement, after which the platen cylinder 10 is operated throughout the remainder of its return stroke. According to the present invention this change in sequence of operations may be accomplished by simply changing the connection of the bell crank lever 30 to the link 29 carried by the shaft 28 of the select return valve 16. When it is desired to first operate the tool slide cylinder 12, the bell crank lever 30 will be connected as shown in Figure 2; and when it is desired to first operate the platen cylinder 10 through a part of its stroke, followed by the complete return operation of the tool slide cylinder, followed by the remainder of the operation of the platen cylinder, said bell crank lever 30 will be connected to the link 29 in the position indicated in Figure 3.

Operation of the device as connected in Figure 2 will be described first. During the forward stroke of the platen responsive to the cylinder 10, liquid pressure is delivered from the source 14 through the conduit 15 to the passageway 60 of the select return valve 16. Liquid under pressure has entrance to the bore 54 through the ports 61, 62 and 63 at all times. Liquid will flow through the port 63, port 67, to the conduit 17, thence to the left-hand end of the platen cylinder 10, moving the piston rod 11 thereof toward the right as the parts are viewed in Figure 1, that is—on the forward stroke of said piston rod. Liquid under pressure also has communication through the ports 61 and 65 and passageway 64 to the conduit 18, through the telescopic connector 27 to the upper portion of the resistance valve 26. Said resistance valve 26 prevents flow of liquid therethrough until the piston in the platen cylinder 10 has completed its stroke. When the piston in the cylinder 10 has completed its stroke, pressure in the system will rise sufficiently to force liquid through the resistance valve 26 through the conduit 25 to the left-hand extremity of the tool slide cylinder 12, forcing the piston rod 13 thereof toward the right. During the latter part of the stroke of said tool slide, the shaft 36 will be moved to the right as the parts are viewed in Figure 2, this shaft 36 being connected to move with the tool slide which is rigid with the piston rod 13. The shifting of the shaft 36 to the right will result in a camming operation between the shoe 37 and the roller 35 of the bell crank lever 30, resulting in the movement of the shaft 28 toward the left as the parts are viewed in Figure 2, resulting in the closure of the port 67 by the piston 56 of the plunger 55. However, liquid under presusre may still flow from conduit 15, passageway 60, passageway 75, past the check valve 77 to the conduit 17, thereby maintaining pressure in the left-hand end of the platen operating cylinder 10, holding said platen at the limit of its movement toward the right.

At the completion of the right-hand stroke, pressure will be reversed at the source of pressure 14 and liquid will be delivered to the conduit 22, the conduit 15 becoming a return line. Liquid will pass from conduit 22 to conduit 21, telescopic connector 23 and conduit 24 to the right-hand end of the tool slide cylinder 12. From the left-hand extremity of the tool slide cylinder 12 liquid will pass through the conduit 25 to the resistance valve 26 (which does not oppose liquid flow in this direction) through the telescopic connector 27 to conduit 18, passageway 64, port 65 and port 61, to the conduit 15. Pressure is also applied in the conduit 22 to the resistance valve 20, which is connected through the conduit 19 to the right-hand end of the platen operating cylinder 10. However, return liquid from the left-hand end of platen cylinder 10 must come through the conduit 17. At this time the port 67 is blocked by the piston 56 and the check valve 77 is seated, and consequently there is no exit for liquid from the conduit 17. Consequently there will be no movement at this time of the piston within the platen cylinder 10, and the tool slide cylinder 12 will operate first.

Return of the tool slide (responsive to the cylinder 12) will result in a movement toward the left of the shaft 36, withdrawing shoe 37 from engagement with the roller 35 of the bell crank lever 30. Bell crank lever 30 will be moved in a counterclockwise direction by the spring return mechanism 32, resulting in a movement toward the right of the shaft 28 to the position illustrated in full lines in Figure 2, opening port 67. Due to the resistance of flow set up by the resistance valve 20, the tool slide cylinder 12 will complete its stroke before the resistance valve 20 passes liquid to the platen cylinder 10. After the completion of movement of the piston within the tool slide cylinder 12, the piston within the platen cylinder will complete its return stroke to the starting position.

In brief, with the connection between the bell crank lever 30 and the link 29 as shown in Figure 2, the sequence of operation will be: Complete operation of the platen cylinder 10 followed by complete operation of the tool slide cylinder 12 toward the right in the forward stroke, followed by a return stroke in which the piston in tool slide cylinder 12 will complete its return stroke to the left, after which the piston in the platen cylinder 10 will complete its return stroke to the left.

The operation of the device for partial return operation of the platen cylinder 10 first, followed by complete return operation of the tool slide cylinder 12, followed by the completion of the return operation of the platen cylinder 10, will now be described.

For this operation the bell crank lever 30 is connected to the link 29 as shown in Figure 3. With this connection (when the shoe 37 is free of the roller 35 of the bell crank lever 30), flow of liquid from the port 61 to the port 65 will be interrupted by the piston 57, but flow of liquid is permitted from the port 62 to the port 65. In the dotted line position of the plunger 55, that is—when the shaft 28 is in the position to which it has been moved when the shoe 37 operates the roller 35, the piston 57 will close port 65. However, liquid may still flow from the conduit 15 through the passageway 69 past the check valve 74 to the passageway 64, whereby pressure may be maintained in the conduit 18 to maintain pressure, or to continue the stroke of the piston within the tool slide cylinder 12 to the end of its stroke. With the exception of the changes in the flow of liquid just noted, the movements of the pistons within the platen cylinder 10 and the tool slide cylinder 12 will be similar to those described in connection with Figure 2 insofar as the forward stroke, that is—movement toward the right of the tool slide, is concerned.

Now considering the return stroke, pressure having been reversed at the source 14, liquid will be delivered to the conduit 22, conduit 21, telescopic connector 23 and conduit 24, to the right-hand extremity of the tool slide cylinder 12. However, inasmuch as the bell crank lever 30 has moved the shaft 28 to the left as the parts are viewed in Figure 3, port 65 is closed, and consequently the return flow of liquid from the left-hand extremity of the cylinder 12 is blocked. Consequently pressure will build up through conduit 24, telescopic connector 23, conduit 21, resistance valve 20, and conduit 19, resulting in the movement of the piston within the platen cylinder 10 to the left a distance sufficient to retract the shoe 37 from engagement with the roller 35 of the bell crank lever 30, thus allowing the spring return mechanism 32 to move the bell crank lever 30 in a counter-clockwise direction, again opening the port 65. During this partial return operation of the platen cylinder 10 there is displacement in the telescopic connector 27, since one telescoping part thereof is fast to the lathe bed and the other telescoping part thereof is fast to the platen. The cross-sectional area of the telescopic connector 27 is relatively small in proportion to the cross-sectional area of the platen cylinder 10. A relatively high pressure is set up within the conduit 18 which is communicated to the sleeve valve 72 within the select return valve 16. The resistance of the valve 72 will be chosen of sufficient value to prevent movement of the piston within the tool slide cylinder 12 until the port 65 is unblocked. After port 65 is unblocked the piston within the tool slide cylinder 12 will make its complete return, after which sufficient pressure will be built up in the conduit 21 to open resistance valve 20 to permit flow of liquid through the conduit 19 to the right-hand end of the platen cylinder 10, after which the piston in said platen cylinder 10 will return through the remaining portion of its stroke.

In brief, with the connections as illustrated in Fig. 3, the piston in the platen cylinder 10 will have its complete movement toward the right, followed by the complete movement of the piston within the tool slide cylinder 12. In the return movement the platen cylinder 10 will operate first until the shoe 37 disengages the roller 35 of the bell crank lever 30, after which the piston in the tool slide cylinder 12 will have its complete return movement, after which the piston in the platen cylinder 10 will pass through the remainder of its return movement.

RECAPITULATION

The sequence of operations may be recapitulated as follows:

*Tool slide cylinder operates first*

FORWARD STROKE

Liquid pressure from the source 14 is communicated through the conduit 15 to the left end of the platen cylinder 10—also to the left end of the tool slide cylinder 12 through the resistance valve 26. Therefore tool slide cylinder 12 does not operate until the platen cylinder 10 has fully operated.

During the latter part of the operation of the tool slide cylinder 12 the plunger 55 in the select return valve 16 is shifted to the left, shutting off flow of liquid through the port 67, but the flow of liquid to the platen cylinder 10 is still permitted past the check valve 77.

RETURN STROKE

At the end of the forward stroke the direction of fluid flow from the source 14 is reversed and liquid is delivered through conduit 22 to two branch circuits: (1) to the right end of the tool slide cylinder 12, and (2) through the resistance valve 20 to the right-hand end of the platen cylinder 10. Liquid will return from the tool slide cylinder 12 through resistance valve 26 (which does not oppose flow in this direction), through the conduit 18 and ports 65 and 61 of the select return valve 16 to the return conduit 15. During the return of the tool slide the shoe 37 is moved to the left, resulting in the unblocking of the port 67. However, due to the resistance set up by the resistance valve 20, pressure of the liquid in the conduit 22 will not be applied to the right-hand end of the platen cylinder 10 until the piston in the tool slide cylinder 12 has reached the end of its stroke toward the left. At that time pressure will build up sufficiently on resistance valve 20 to pass liquid to the right-hand end of the platen cylinder 10, resulting in the movement of the piston thereof to its extreme left-hand position.

*Platen cylinder has partial operation first*

FORWARD STROKE

Pressure is applied through the conduit 15 through the select return valve 16 to the left end of the platen cylinder 10—also to the left-hand end of the tool slide cylinder 12 through resistance valve 26. Therefore, the tool slide cylinder 12 does not operate until the piston in the platen cylinder 10 has completed its stroke toward the right.

During the latter part of the operation of the tool slide cylinder 12 the plunger 55 in the select return valve 16 is shifted to the left, blocking the port 65. However, liquid may flow past the check valve 74 to passageway 64 and conduit 18, whereby after pressure has built up sufficiently to open resistance valve 26, pressure will be communicated to the left end of tool slide cylinder 12 to cause its piston to move to the right in its forward stroke.

RETURN STROKE

At the end of the forward stroke of the tool slide the direction of fluid flow from the source 14 is reversed and liquid is delivered through conduit 22 to two branches: (1) to the right-hand end of the tool slide cylinder 12, and (2) through the resistance valve 20 to the right-hand end of the platen cylinder 10. However, as noted in the preceding paragraph, port 65 is blocked and consequently fluid cannot flow through the conduit 18. Pressure will build up sufficiently to open the resistance valve 20, permitting the flow of fluid through the conduit 19 to the right-hand end of platen cylinder 10, liquid flowing from the left-hand end of the platen cylinder through the conduit 17 to select return valve 16 through passageway 66 and ports 67 and 63 to the return line 15. After the piston in the platen cylinder 10 has moved through a short distance, the shoe 37 will have been moved out of engagement with the bell crank lever 30, resulting in the shifting toward the right of the shaft of the select return valve 16. This movement to the right will uncover port 65 in the select return valve 16 and consequently liquid will pass from the conduit 22, through telescopic connector 23 and conduit 24 to the right-hand end of the tool slide cylinder 12, liquid passing from the left-hand end of cylinder 12 through the resistance valve 26 (which offers no opposition to flow in this direction), through the extensible telescopic connector 27 and conduit 18 to the select return valve 16, through passageway 64 thereof and ports 65 and 62 to the return conduit 15. After the piston of the tool slide cylinder 12 has moved to its limit in the left-hand direction, pressure will build up to a sufficient value to open resistance valve 20, communicating pressure through conduit 19 to the right-hand end of the platen cylinder 10, moving the piston in said cylinder to its extreme left-hand position, completing the return stroke of the mechanism. Liquid flowing from the left end of the platen cylinder 10 will pass through conduit 17 to the select return valve 16, through ports 67 and 63 thereof to the return conduit 15. During the partial return of the piston in the platen cylinder 10 a relatively high pressure will be set up in the conduit 18, and this relatively high pressure will be relieved through the valve 72 in the select return valve 16. However, the spring pressure on said valve 72 is sufficient to prevent operation of the piston in the tool slide cylinder 12 until port 65 has been unblocked.

Though a preferred embodiment of the present invention has been described in detail, many modifications will occur to those skilled in the art. It is intended to cover all such modifications that fall within the scope of the appended claims.

What is claimed is:

1. In combination, a pair of reciprocating fluid motors each comprising a cylinder and a piston operable therein and which constitute a relatively stationary and a relatively movable element, the relatively movable element of one of said motors being connected to the relatively stationary element of the other of said motors, a common source of liquid pressure adapted to be selectively connected to the two ends of each of said cylinders, selective valve means for predetermining the sequence of operation of said motors, said selective valve means including a housing having a bore, a first passageway connected to said source, a second passageway and a third passageway connected to two opposite ends of said pair of cylinders, three ports connecting said bore with said first passageway, a port connecting said second passageway with said bore, and a port connecting said third passageway with said bore, said first passageway being connected to said third passageway through a check valve adapted to stop flow from said third passageway to said first passageway, and a plunger in said bore having a pair of pistons, said plunger being adapted to be positioned to permit access from said first passageway to said second and third passageways, said plunger having another position in which one of said pistons is adapted to block communication between said third passageway and said first passageway, and said plunger having still another position in which one of said pistons stops communication between said second passageway and said first passageway.

2. In combination, a pair of reciprocating fluid motors each comprising a cylinder and a piston operable therein and which constitute a relatively stationary and a relatively movable element, the relatively movable element of one of said motors being connected to the relatively stationary element of the other of said motors, a common source of liquid pressure adapted to be selectively connected to the two ends of each of said cylinders, selective valve means for predetermining the sequence of operation of said motors, said selective valve means including a housing having a bore, a first passageway connected to said source, a second passageway and a third passageway connected to two opposite ends of said pair of cylinders, three ports connecting said bore with said first passageway, a port connecting said second passageway with said bore, a port connecting said third passageway with said bore, said first passageway being connected to said third passageway through a check valve adapted to stop flow from said third passageway to said first passageway, a plunger in said bore having a pair of pistons, said plunger being adapted to be positioned to permit access from said first passageway to said second and third passageways, said plunger having another position in which one of said pistons is adapted to block communication between said third passageway and said first passageway, said plunger having still another position in which one of said pistons stops communication between said second passageway and said first passageway, and means responsive to the position of the relatively movable element of said other motor adapted to reciprocate said plunger, the connection between said plunger and said last mentioned means being variable whereby to change the setting of said plunger in said selective valve means for a predetermined position of said relatively movable element of said other motor.

3. In combination, a pair of reciprocating fluid motors each comprising a cylinder and a piston operable therein and constituting relatively stationary and relatively movable elements, a relatively movable element of one of said motors being connected to a relatively stationary element of the other of said motors, a common source of liquid pressure adapted to be selectively connected to the two ends of each of said cylinders, selective valve means for predetermining the sequence of operation of said motors, said selective valve means including a plunger, means responsive to the position of the movable element of said other motor for moving said plunger, said last mentioned means having two alternative connections with said plunger, said selective valve means including a housing having a bore receiving said plunger and having a first passageway connected to said source, a second passageway and a third passageway connected to two opposite ends of said pair of cylinders, three ports connecting said first passageway with said bore, a port connecting said second passageway with said bore, a port connecting said third passageway with said bore, and means permitting communication from said first passageway to said third passageway but stopping communication from said third passageway to said first passageway, said plunger having a pair of pistons adapted alternatively to stop communication between said bore and said second passageway, to stop communication between said third passageway and said bore, and to permit communication through said bore between said first passageway and said second passageway and between said first passageway and said third passageway.

4. In combination, a pair of reciprocating fluid motors each comprising a cylinder and a piston operable therein and constituting relatively stationary and relatively movable elements, a relatively movable element of one of said motors being connected to a relatively stationary element of the other of said motors, a common source of liquid pressure adapted to be selectively connected to the two ends of each of said cylinders, selective valve means for predetermining the sequence of operation of said motors, said selective valve means including a plunger, means responsive to the position of the movable element of said other motor for moving said plunger, said last mentioned means having two alternative connections with said plunger, said selective valve means including a housing having a bore receiving said plunger and having a first passageway connected to said source, a second passageway and a third passageway connected to two opposite ends of said pair of cylinders, three ports connecting said first passageway with said bore, a port connecting said second passageway with said bore, a port connecting said third passageway with said bore, and means permitting communication from said first passageway to said third passageway but stopping communication from said third passageway to said first passageway, said plunger having a pair of pistons adapted alternatively to stop communication between said bore and said second passageway, to stop communication between said third passageway and said bore, and to permit communication through said bore between said first passageway and said second passageway and between said first passageway and said third passageway, said plunger being mounted upon a shaft extending through the ends of said housing, said shaft at the regions extending through said ends of said housing having uniform diameter, said pistons having uniform diameter, and certain of said passageways and ports providing free communication between the spaces at the two ends of said plunger.

5. In combination, a pair of reciprocating fluid motors each comprising a cylinder and a piston operable therein and constituting relatively stationary and relatively movable elements, a relatively movable element of one of said motors being connected to a relatively stationary element of the other of said motors, a common source of liquid pressure adapted to be selectively connected to the two ends of each of said cylinders, selective valve means for predetermining the sequence of operation of said motors, said selective valve means including a plunger, means responsive to the position of the movable element of said other motor for moving said plunger, said last mentioned means having two alternative connections with said plunger, said selective valve means including a housing having a bore receiving said plunger and having a first passageway connected to said source, a second passageway and a third passageway connected to two opposite ends of said pair of cylinders, three ports connecting said first passageway with said bore, a port connecting said second passageway with said bore, a port connecting said third passageway with said bore, means permitting communication from said first passageway to said third passageway but stopping communication from said third passageway to said first passageway, said plunger having a pair of pistons adapted alternatively to stop communication between said bore and said second passageway, to stop communication between said third passageway and said bore, and to permit communication through said bore between said first passageway and said second pasasgeway and between said first passageway and said third passageway, and means responsive to the position of the relatively movable element of said other motor adapted to reciprocate said plunger, the connection between said plunger and said last mentioned means being variable whereby to change the setting of said plunger in said selective valve means for a predetermined position of said relatively movable element of said other motor.

6. In combination, a pair of reciprocating fluid motors each comprising a cylinder and a piston operable therein and which constitute a relatively stationary and a relatively movable element, the relatively movable element of one of said motors being connected to the relatively stationary element of the other of said motors, a common source of liquid pressure, means for selectively connecting said common source to the two ends of each of said cylinders, said means including telescopic connector means, selective valve means for predetermining the sequence of operation of said motors, said selective valve means including a housing having a bore, a first passageway connected to said source, a second passageway and a third passageway connected to two opposite ends of said pair of cylinders, three ports connecting said bore with said first passageway, a port connecting said second passageway with said bore, and a port connecting said third passageway with said bore, said first passageway being connected to said third passageway through a check valve adapted to stop flow from said third passageway to said first passageway, a resistance valve controlling communication from said second passageway to said first passageway adapted to yield when a predetermined pressure has been developed due to the functioning of said telescopic connector means, and a plunger in said bore having a pair of pistons, said plunger being adapted to be positioned to permit access from said first passageway to said second and third passageways through said bore, said plunger having another position in which one of said pistons is adapted to block communication between said third passageway and said first passageway, and said plunger having still another position in which one of said pistons stops communication between said second passageway and said first passageway.

LEVI D. TYSON.

REFERENCES CITED

The following references are of record in the file of this patent:

UNITED STATES PATENTS

| Number | Name | Date |
|---|---|---|
| 1,697,865 | Hahn | Jan. 8, 1929 |
| 1,970,530 | West | Aug. 14, 1934 |
| 2,008,011 | Foster | July 16, 1935 |
| 2,027,568 | Whipp | Jan. 14, 1936 |
| 2,042,186 | Peterson | May 26, 1936 |
| 2,048,107 | Collins | July 21, 1936 |
| 2,244,213 | Patton | June 3, 1941 |
| 2,244,471 | Nichols | June 3, 1941 |
| 2,270,943 | Freundel | Jan. 27, 1942 |
| 2,312,432 | Mercier | Mar. 2, 1943 |
| 2,327,920 | Moohl | Aug. 24, 1943 |